May 23, 1933. R. C. CHARLTON 1,910,087
FLOOR SCRAPER
Filed Nov. 30, 1931
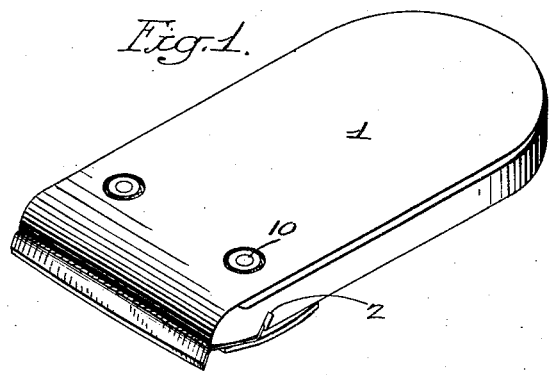
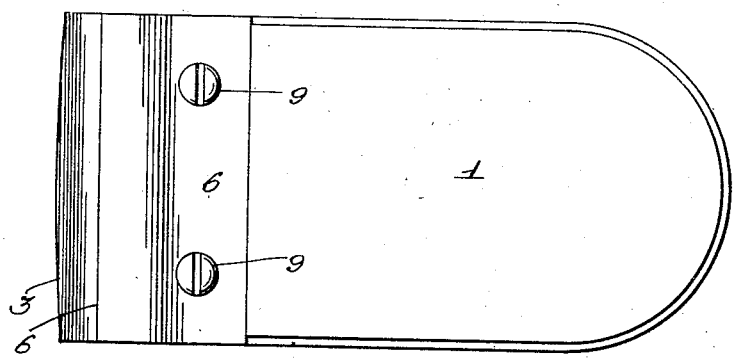
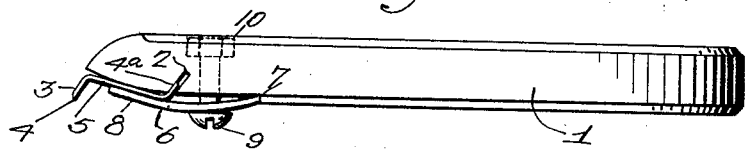
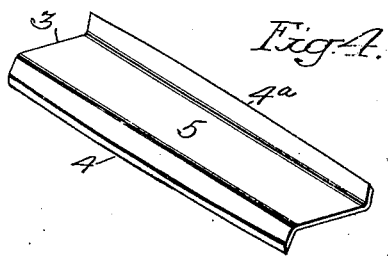

Patented May 23, 1933

1,910,087

UNITED STATES PATENT OFFICE

RICHARD C. CHARLTON, OF PHILADELPHIA, PENNSYLVANIA, ASSIGNOR TO HENRY DISSTON & SONS, INCORPORATED, OF TACONY, PENNSYLVANIA, A CORPORATION OF PENNSYLVANIA

FLOOR SCRAPER

Application filed November 30, 1931. Serial No. 578,181.

My invention relates to certain improvements in scraping tools used in scraping the floors of buildings.

The object of my invention is to make a simple and effective scraper having two scraping edges, one edge being in the scraping position while the other edge is clamped in a groove in the handle of the cutter.

The main object of the invention is to make the scraper Z-shaped in cross-section, so that the edge in use will extend downwards beyond the clamping means, while the edge not in use will extend upwards into the body of the handle. By this means I provide a very rigid scraper in which there is a clear space for shavings back of the scraping edge.

A further object of my invention is to provide a spring metal clamp for the scraper, so that the scraper blade will be held firmly to the handle.

In the accompanying drawing:

Fig. 1 is a perspective view illustrating my improved scraping blade mounted in the handle;

Fig. 2 is an inverted plan view;

Fig. 3 is a side view; and

Fig. 4 is a detached perspective view illustrating my improved Z-shaped scraping blade.

Referring to the drawing: 1 is the handle, which may be of any form desired. This handle has an angular slot 2 in its underside. 3 is the Z-shaped scraper blade having two scraping edges 4—4a and a body portion 5. The scraper blade is Z-shape in form and the edges 4—4a are beveled to provide a sharp scraping edge and are slightly curved as shown in Fig. 4.

6 is a spring clamp which extends the full width of the handle in the present instance. The rear end of this clamp plate rests against a shoulder 7 on the handle, and the front portion 8 of the clamp rests against the body 5 of the Z-shaped scraper blade. The clamp plate is curved as shown in Fig. 3, so that it can be drawn tightly onto the body 5 of the scraper blade by bolts 9, which pass through openings in the clamp plate and into and through the handle as shown in Fig 3, and into nuts 10 which are imbedded in the handle, so that the outer surfaces of the nuts are substantially flush with the upper surfaces of the handle.

By simply removing the bolts 9 the clamp plate 6 can be removed and the Z-shaped scraper blade 3 can be detached, and if the active cutting edge is dull, then the blade can be reversed so that the scraping edge 4a becomes the active edge. By this construction I not only provide two scraping edges for the blade but the blade will be substantial and rigid due to the cross-sectional Z-shape of the blade. The inactive edge of the blade extends into the slot 2 and holds the blade in alignment with the edge of the handle and the clamping plate 6 can be forced down onto the body 5 of the blade 3, as there is no projection on the blade back of the active scraping edge, so that the blade can be held firmly in position, and by making the blade Z-shape in cross-section, as described above, there is sufficient clearance for the shavings when the scraper is in action.

I claim:—

1. The combination in a floor scraper, of a handle having a transverse angular slot therein some distance from the front edge thereof; a Z-shaped scraping blade and a clamping plate bearing upon the body portion of the blade, the inactive portion of the Z-shaped blade extending into the slot in the handle, and the active portion projecting beyond the clamp; and means for securing the clamp to the handle.

2. The combination in a floor scraper, of a handle having a transverse angular slot on the underside thereof, some distance from the edge; a Z-shaped scraping blade;

two angular portions, the inactive portion extending into the slot in the handle and the active portion projecting beyond the front end of the handle and below the handle, said handle having a shoulder back of the slot therein; a spring clamping plate bearing upon the body of the scraper blade, the rear end of the clamping plate resting against the shoulder; and clamping screws extending through openings in the clamp plate and through the handle and into nuts imbedded in the upper surface of the handle.

RICHARD C. CHARLTON.